May 29, 1928.
V. HAGGER
1,671,241
FASTENER FOR COWLING AND THE LIKE FOR AIRCRAFT AND OTHER STRUCTURES
Filed Jan. 6, 1927
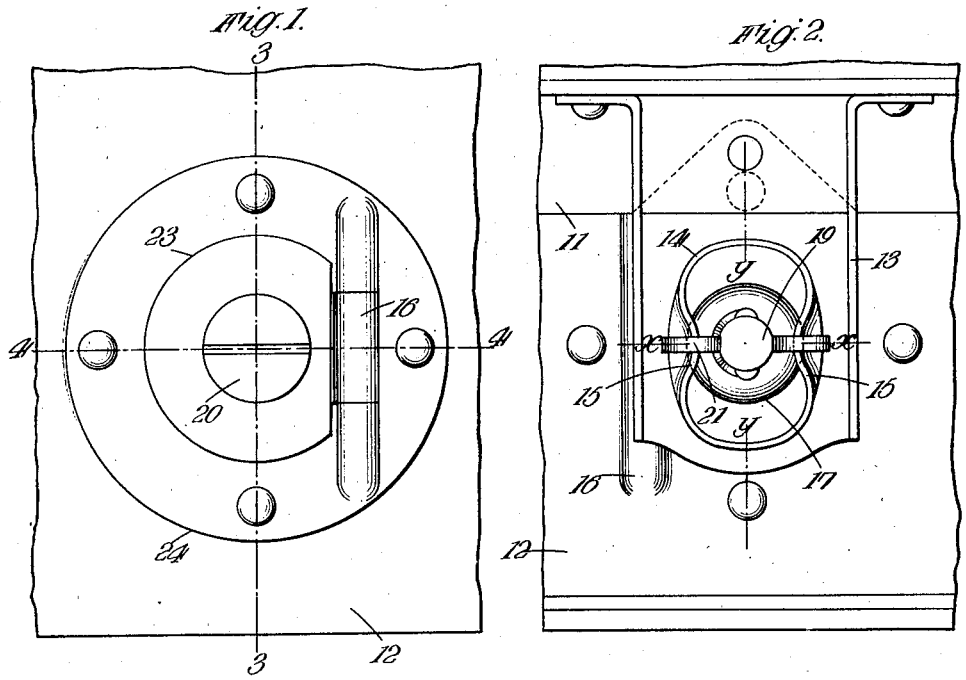
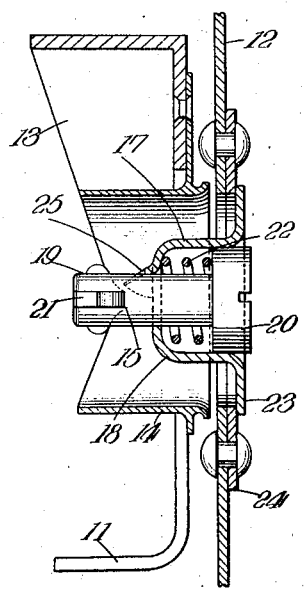
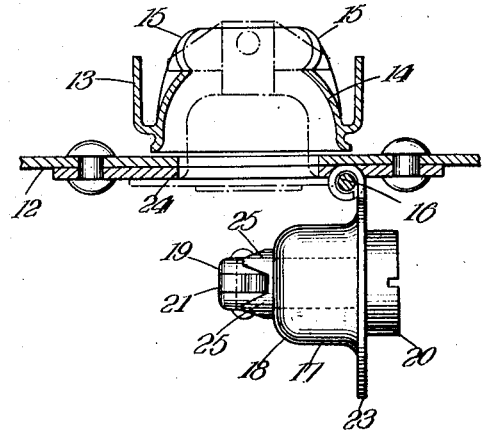
Inventor,
Victor Hagger
M. T. Lockwood
Attorney.

Patented May 29, 1928.

1,671,241

UNITED STATES PATENT OFFICE.

VICTOR HAGGER, OF EAST ACTON, ENGLAND, ASSIGNOR TO CHARLES RICHARD FAIREY, OF CRANFORD LANE, HAYES, ENGLAND.

FASTENER FOR COWLING AND THE LIKE FOR AIRCRAFT AND OTHER STRUCTURES.

Application filed January 6, 1927, Serial No. 159,386, and in Great Britain July 10, 1926.

This invention is an improvement upon that forming the subject of Letters Patent No. 1,594,776 which relates to what may be termed a turn-button device for detachably securing cowling or the like to a support such as the framework of aircraft; the object of the present invention being to provide a modified construction suited for use more particularly in cases where the cowling or the like (hereinafter referred to shortly as "cowling") is secured by a plurality of turn-buttons whereof the individual axes do not all extend parallel to one another, as for example where a single piece of cowling has been "panel beaten" and requires to be applied to and removed from the support in a direction oblique to the axes of some of the turn-buttons whereby it is secured in position.

Each turn-button device forming the subject of Letters Patent No. 1,594,776 has two coacting members mounted respectively on the cowling and on its support so that their axes, which are substantially normal to the general plane of the cowling, coincide when the members are in mutual engagement. That member which is mounted on the support consists of a socket presenting an open-ended passage of non-circular cross-section the lip at the inner extremity of which is notched at opposite sides of the narrowest part; and that member which is mounted on the cowling comprises a seating adapted to enter said socket so as to position the cowling on its support, and a stud extending axially through the seating and carrying at its inner end a transverse cotter of a length such that it can be passed through the non-circular passage only when extending in the direction of the widest part thereof. The arrangement is such as to permit of the stud being first passed through said passage until the cotter is clear of the inner extremity thereof and thereafter turned about its axis through part of a revolution to allow the cotter to engage, under spring-action, in the notches at opposite sides of the narrowest part of said extremity; the same spring-action also serving to hold the cowling closely against its support.

According to the present invention that member of the turn-button device which is mounted upon the cowling is attached thereto not immovably or fixedly, but in such manner that, when the cowling is in position on its support, the seating for the stud and cotter can be inserted into or withdrawn from the non-circular passage of that member of the device which is mounted upon the support, without concurrent movement of the cowling relatively to the support. As a result, the cowling may be applied accurately in position by a movement oblique to the axis of the non-circular passage, before the seating for the stud and cotter is introduced into said passage, and conversely, after the cotter has been unlocked, the seating can be withdrawn from the non-circular passage independently of the cowling, which latter can then be removed from its support by a movement oblique to the axis of the non-circular passage.

For this purpose the seating for the stud and cotter may be attached to the cowling externally by a hinge so placed that, when the cowling is in position upon its support, the seating can be introduced into or withdrawn from the non-circular passage by simple movement about the hinge and without disturbing the cowling; the retention of the seating in said passage being due to the spring-action whereby the cotter, when in locking position, engages the notches at the inner extremity of the non-circular passage and thus holds the cowling closely against its support.

One form of the invention is illustrated in the accompanying drawings, wherein Figure 1 is an elevation of the improved device viewed from outside the cowling when the latter is in position and the turn-button is locked; Figure 2 is an elevation viewed from inside the support, with the cowling locked in position; Figure 3 is a section on line 3—3 of Figure 1; and Figure 4 is a section on line 4—4 of Figure 1, but with the seating for the stud and cotter withdrawn from the non-circular passage of the member mounted on the support.

11 represents a portion of the structure forming a support for the cowling 12. To the support 11 is secured, by means of a bracket 13, a socket consisting of a short length 14 of tubing of oval section whereof the longitudinal axis is normal to the plane in which the cowling extends at that point, the edge of the inner end of the tube 14 being cut away at opposite points 15, 15 of its minor transverse axis $x-x$ (Figure 2) so as to present notches merging gradually into the general contour of said end.

The cowling 12 is suitably apertured at a point corresponding with the position of the oval socket 14, and has hinged to it, on an axis 16 on one side of the aperture, a seating for the stud and cotter, constituted by a cylindrical box or gland 17 adapted to project inwards through the aperture and of a diameter slightly less than the length of the minor transverse axis $x-x$ of the socket 14. The gland 17 has its inner end closed as at 18 but centrally apertured to give passage to, and guide, the shank of a stud 19 having at its outer end a head 20 slidable in the gland 17 and notched or otherwise adapted to be engaged by a screw-driver or like tool; whilst at its inner end the stud 19 carries a transverse cotter 21 whereof the length is less than that of the major transverse axis $y-y$ but greater than that of the minor transverse axis $x-x$ of the oval socket 14. Coiled about the stud 19 under compression between the head 20 and the abutment constituted by the bottom 18 of the gland 17, is a spring 22 constantly tending to force the stud outwards. In order to facilitate the correct positioning of the cotter 21 relatively to the major transverse axis $y-y$ of the oval socket 14 preparatory to the application of the cowling 12 to, or its removal from, the support 11, the closed inner end 18 of the gland 17 is formed, at one side of the aperture therein, with a pair of rearwardly-projecting lugs 25 between which the cotter 21 engages, as indicated in Figure 4, when extending in the direction of said major transverse axis $y-y$.

The gland 17 is formed at its outer end with a flange 23 adapted to close snugly against the outer surface of the cowling 12 or, as in the example illustrated, against a reinforcing plate 24 riveted to the cowling around the aperture therein; one member of the hinge 16 being formed in the flange 23 and the other in the plate 24.

It will be evident that, when the cotter 21 is unlocked from the notches 15, 15 of the oval socket 14 and the gland 17 is swung outwards about the hinge 16, the cowling 12 can be applied to or removed from the support 11 by movement in a direction other than normal to the general plane of the cowling at the point where the turn button device is situated, so that it is not essential that all the turn-buttons for securing a single piece of cowling should have their longitudinal axes extending parallel to one another.

Having now particularly described and ascertained the nature of my said invention and in what manner the same is to be performed I declare that what I claim is:—

1. In a device for detachably securing cowling and the like to a supporting structure, comprising a socket member attached to the supporting structure, a gland adapted to be mounted on the cowling for insertion in said socket, said gland having a spring-influenced stud, slidable and rotatable therein and provided with a transverse cotter adapted, when the gland is inserted in the socket and the stud partially rotated, to cause the cotter to engage the socket, so as to prevent separation of the cowling from the supporting structure; the combination therewith of a plate secured to the cowling and a hinge connection between said gland and said plate, the arrangement being such that the cowling may first be positioned with respect to the socket, and the gland then swung on its hinge into the socket to be fastened therein by rotation of said spring-influenced stud.

2. The device for detachably securing cowling and the like to a supporting structure, as claimed in claim 1, in which said socket is elongated in one direction for permitting insertion of the cotter carried by said stud on the gland, and the hinge between the gland and the plate attached to the cowling is parallel to the direction of elongation of said socket.

3. The device for detachably securing cowling and the like to a supporting structure, as claimed in claim 1, in which the plate secured to the cowling and to which the gland is hinged comprises a perforated disc, the perforation of which is adapted to coincide with a hole in the cowling, and said gland, when swung into the socket, is adapted to pass through the perforation in said plate and the hole in the cowling, and said spring on the cotter stud is adapted to hold the gland against the plate and the cowling in close cooperative relation with the socket on the supporting structure.

VICTOR HAGGER.